Feb. 23, 1954
A. BERGERON
2,670,257
PISTON RING
Filed June 21, 1950
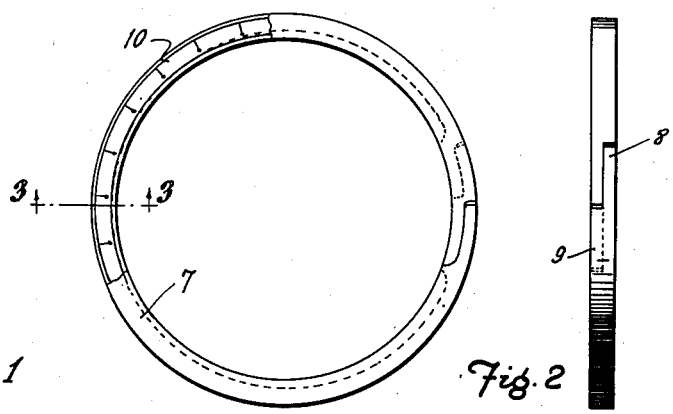
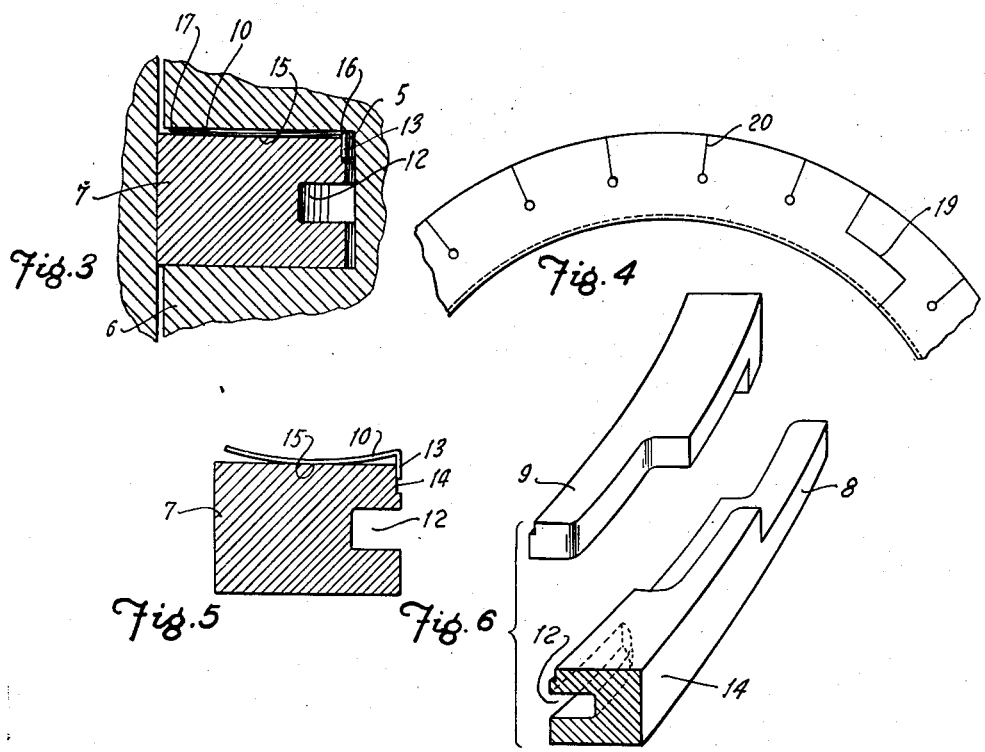
INVENTOR.
Alfred Bergeron
BY
Maurice Landers
ATTORNEY Patented Feb. 23, 1954

2,670,257

UNITED STATES PATENT OFFICE 2,670,257

PISTON RING

Alfred Bergeron, Dallas, Tex.

Application June 21, 1950, Serial No. 169,429

17 Claims. (Cl. 309—44)

This invention has for an object to provide an improved piston ring or packing ring which will bear with equal pressure against all sides of the cylinder in which it is used.

Another object is to provide means for maintaining the piston ring firmly against one side of the piston ring groove thereby preventing hammering of the walls of the groove by the ring and maintaining a better seal.

Another object is to provide an auxiliary flexible sealing ring which inhibits leakage of the gas or liquid past the piston ring into the piston groove.

The invention has been developed more particularly for the production of packing rings for high pressure gas and oil engines but it is also applicable to rings for various kinds of liquid and gas pumps including vacuum pumps.

The nature and objects of the invention will be better understood from a description of a selected embodiment thereof, for the purposes of which description, reference should be had to the accompanying drawing forming a part hereof and in which Figure 1 is a plan view of a packing ring embodying the invention. The auxiliary sealing ring is shown in part.

Fig. 2 is an edge view of the same showing the joint between the free ends of the piston ring in expanded position.

Fig. 3 is an enlarged sectional detail view taken on the line 3—3 of Fig. 1 but showing the piston ring in position in the ring receiving groove of a piston and engaging against the side wall of a cylinder.

Fig. 4 is a plan view of a portion of a sealing ring constituting one part of the complete packing ring of the invention.

Fig. 5 is a sectional view of a packing ring including the sealing ring but in uncompressed condition, curvature exaggerated.

Figure 6 is a perspective view showing the two ends of the expansion ring separated but adjacent to each other.

The piston ring or packing ring shown is designed for use as one of the rings in the usual ring receiving groove of rectangular cross-section as indicated at 5 of a piston 6. It comprises a main expansion ring 7 having inter-engaging ends formed with tongues 8, 9 cooperating to provide a seal both radially and longitudinally of the piston, together with an auxiliary sealing and spring-pressure ring 10 which affords a seal to inhibit high pressure combustion gases or any gas or liquid passing above and behind the expansion ring into the ring receiving groove. Ring 10 acts also as a pressure ring maintaining the expansion ring 7 firmly in contact with the opposite wall of the piston groove. When the packing ring is used on a high compression engine or pump the high pressure acts with and not in opposition to the spring pressure ring to maintain sealing contact between the expansion ring and the wall of the piston groove. When used on a vacuum pump or the like the position of the ring may be reversed if desired.

Expansion ring 7 may be of cast iron or other suitable material. It is formed with a groove 12 along one face, preferably its inner face, which groove varies from a minimum depth opposite the free ends of the ring to a maximum depth adjacent the ends where the ring is cut away to form the tongues 8 and 9. By this arrangement the flexibility varies from minimum at the center of the length of the ring to maximum near its ends to provide more even pressure against different parts of the cylinder wall. Each of the overlapping tongues is of a thickness radially equal to about half of the radial thickness of the expansion ring and of a thickness transversely equal to about half of the thickness of the expansion ring in a direction longitudinal of the piston. These tongues fit into and slide in corresponding grooves in the mating ends of the ring.

The sealing ring 10 is formed with a cylindrical flange 13 at its inner edge which fits in a cylindrical recess 14 extending along the inner periphery of the packing ring at its upper edge as shown in the drawing. The sealing ring is of generally flat shape except for the flange 13 but is slightly curved or arched transversely of its length to provide a spring action whereby at substantially the center of its width radially or the crown of the arch it will bear against the crown of the expansion ring 7 as indicated at 15 and along its edges it will bear against the upper face of the ring-receiving groove of the piston as indicated at 16 and 17. In order that the sealing ring may be opened to apply it to a piston it is cut on a broken line and the ends engaged to provide a substantially continuous structure as indicated at 19 in Fig. 4. The material of the ring is chosen to provide the desired spring action under the conditions of use. Various suitable alloys are available.

The outer diameter of the sealing ring is made sufficiently less than the diameter of the piston with which the packing ring is to be used so that the outer edge will at all times in use lie inside of the outer face of the piston. The object of this provision is to reduce the possibility of gas pressure during an explosion of the engine exerting pressure on the upper surface of this sealing ring and to permit such gas pressure to engage the upper face of the packing ring. By this arrangement the gas pressure cooperating with the spring pressure of the sealing ring presses the expansion ring firmly against the lower face of the ring-receiving groove to insure a good seal.

If desired the flexibility of the sealing ring may be increased by forming radial slots 20 at spaced intervals along the outer edge of the ring, preferably with their inner ends terminating in small drilled or punched holes to prevent breakage. These holes should lie along the center line of the ring where it bears on the expansion ring as indicated at 15 in Fig. 3 in order that the holes may be sealed by this contact to prevent passage of gas.

It is to be understood that the foregoing particular description of the selected embodiment of the invention is illustrative merely and that variations of structure and arrangement and use of the novel features in other combinations may be made without departing from the spirit of the invention as defined in the claims.

I claim:

1. A packing ring of the character described having a joint including end portions reduced to form overlapping tongues which provide a seal at the joint, said ring having a groove extending along its inner periphery between the reduced ends, said groove being of minimum depth at the center of its length and of gradually increasing depth toward both ends but terminating short of the reduced portions.

2. A packing ring for use in a rectangular ring-receiving groove of a piston comprising an expansion ring having complementary overlapping ends and having an inner eccentric groove of varying depth to provide flexibility varying from minimum at the center of the length of the ring to maximum near its ends, and a flexible sealing ring of thin metal engaging one face of the expansion ring, said sealing ring being curved transversely of its length and being compressible transversely of its thickness and adapted to form a seal between the sealing ring and piston and between the sealing ring and the expansion ring.

3. A packing ring for use in a ring-receiving groove of a piston as defined in claim 2 wherein the sealing ring is formed with transverse slots to provide flexibility.

4. A packing ring for use in the ring-receiving groove of a piston comprising an expansion ring and a flexible sealing ring engaging one flat side face of the expansion ring, said sealing ring having an extension for engagement with the inner periphery of said expansion ring, said sealing ring being arched in cross-section throughout its length and resiliently compressible and adapted to engage resiliently between the side face of the expansion ring and the side wall face of the ring-receiving groove with the edges of the arch against one face and the crown of the arch against the other face.

5. A packing ring for use in the ring-receiving groove of a piston comprising an expansion ring and a flexible sealing ring engaging one face of the expansion ring, said sealing ring being arched transversely of its length and resiliently compressible and adapted to engage resiliently against the expansion ring at the crown of the arch and against the wall of the ring-receiving groove at its edges, said sealing ring being slotted transversely to increase its flexibility, the slots extending from one edge of the ring to the high point of the arch and terminating in holes.

6. A packing ring as defined in claim 4 wherein the sealing ring has a flange along its inner periphery engaging within the expansion ring to limit its radial outward movement.

7. A packing ring for use in a rectangular ring-receiving groove of a piston comprising an expansion ring having complementary overlapping ends and having an inner eccentric groove of varying depth to provide flexibility varying from minimum at the center of the length of the ring to maximum near its ends, said ring having a flange-receiving recess along its periphery at one edge, and a flexible sealing ring of thin metal formed with a cylindrical flange engaging in the flange-receiving recess of the expansion ring, said sealing ring being curved transversely of its length to form an arc and being compressible transversely of its thickness to fit within the ring-receiving groove and to exert pressure against the expansion ring to press it against the opposite wall of the ring-receiving groove of a piston.

8. A packing ring as defined in claim 7 wherein the outside diameter of the sealing ring is of smaller diameter than the outside diameter of the piston with which it is to be used.

9. A packing ring as defined in claim 7 wherein the sealing ring is formed with transverse slots to provide flexibility.

10. A packing ring for use in the ring-receiving groove of a piston comprising an expansion ring and a flexible sealing ring engaging one flat side face of the expansion ring, said sealing ring having an extension for engagement with the inner periphery of said expansion ring, said sealing ring being arched in cross-section throughout a major portion of its length and resiliently compressible to engage between the side face of the expansion ring and the side wall face of the ring-receiving groove with the edges of the arch against one face and the crown of the arch against the other face.

11. A packing ring for use in the ring-receiving groove of a piston comprising an expansion ring and a flexible sealing ring engaging one face of the expansion ring, said sealing ring being arched transversely of its length and resiliently compressible, said piston groove having a wall, said sealing ring crown and edges when compressed engaging said one face of said expansion ring and said wall of the piston groove, said sealing ring being slotted transversely to increase its flexibility, the slots extending from one edge of the ring to the high point of the arch and terminating in holes.

12. A packing ring for use in a rectangular ring-receiving groove of a piston comprising an expansion ring having complementary overlapping ends, said ring having a flange-receiving recess along its periphery at one edge, and a flexible sealing ring of thin metal formed with a cylindrical flange engaging in the flange-receiving recess of the expansion ring, said sealing ring being curved transversely of its length to form an arc and being compressible transversely of its thickness to fit within the ring-receiving groove and to exert pressure against the expansion ring to press it against the opposite wall of the ring-receiving groove of the piston.

13. A packing ring as defined in claim 12, wherein the sealing ring is formed with transverse slots whereby to increase the flexibility of said sealing ring.

14. A packing ring for use in the ring-receiving groove of a piston comprising an expasion ring and a flexible sealing ring engaging one face of the expansion ring, said sealing ring being arched transversely of its length and resiliently compressible to engage resiliently between the expansion ring and the wall of the ring-receiving groove with the crown of the arch engaging the expansion ring, said sealing ring being slotted transversely to increase its flexibility, the slots extending from the outer edge of the ring to the high point of the arch and terminating in holes at the high point of the arch, which holes are substantially sealed by the engagement of the high point of the arch and the part engaged thereby.

15. A packing ring for use in a rectangular ring-receiving groove of a piston comprising an expansion ring and a flexible sealing ring, said sealing ring being arched transversely of its length and resiliently compressible to engage resiliently between the expansion ring and the wall of the ring-receiving groove with the crown of the arch engaging the expansion ring, said sealing ring having a cylindrical flange engaging the inner face of the expansion ring to limit outward radial movement of the sealing ring, said sealing ring being of smaller diameter than the piston to prevent projection of the sealing ring beyond the outer face of the piston.

16. A packing ring for use in a rectangular ring-receiving groove of a piston comprising an expansion ring and a flexible sealing ring, said sealing ring being arched transversely of its length and resiliently compressible to engage resiliently between the expansion ring and the wall of the ring-receiving groove with the crown of the arch engaging the expansion ring and the edges of the arch engaging the wall of the piston groove, said expansion ring having a recess along the upper edge of its inner periphery and said sealing ring having a cylindrical flange at its inner edge engaging in said recess to prevent radial outward movement of the sealing ring, substantially as and for the purpose described.

17. A packing ring for use in the ring-receiving groove of a piston comprising an expansion ring and a flexible sealing ring engaging one flat side face of the expansion ring, said sealing ring being in engagement with the pressure face of said expansion ring whereby fluid under pressure acts in the same direction as the pressure of said sealing ring against the said pressure face of said expansion ring, said sealing ring being arched in cross-section throughout its length and resiliently compressible and adapted to engage resiliently between the side face of the expansion ring and the side wall face of the ring-receiving groove, with the edges of the arch against one face and the crown of the arch against the other face, said expansion ring and said sealing ring each having open ends, said open ends of each of said rings having stepped surfaces.

ALFRED BERGERON.

References Cited in the file of this patent

UNITED STATES PATENTS

| Number | Name | Date |
| --- | --- | --- |
| 1,181,618 | Smith | May 2, 1916 |
| 1,292,101 | Shaw | Jan. 21, 1919 |
| 1,343,828 | Jordan | June 15, 1920 |
| 1,378,894 | Norman | May 24, 1921 |
| 1,390,577 | Nagy | Sept. 13, 1921 |
| 1,515,246 | Ford | May 11, 1924 |
| 1,597,452 | Mason | Aug. 24, 1926 |
| 1,779,034 | Dusinberre | Oct. 21, 1930 |
| 1,958,313 | Powell | May 8, 1934 |
| 2,231,801 | Cords | Feb. 11, 1941 |
| 2,415,984 | Ballard | Feb. 18, 1947 |

FOREIGN PATENTS

| Number | Country | Date |
| --- | --- | --- |
| 811,626 | France | Jan. 23, 1937 |